(12) United States Patent
Morgenstern

(10) Patent No.: US 10,715,325 B2
(45) Date of Patent: Jul. 14, 2020

(54) SECURE, REAL-TIME BASED DATA TRANSFER

(71) Applicant: Siemens Aktiengesellschaft, Munich (DE)

(72) Inventor: Joachim Morgenstern, Jockgrim (DE)

(73) Assignee: Siemens Aktiengesellschaft, Munich (DE)

( * ) Notice: Subject to any disclaimer, the term of this patent is extended or adjusted under 35 U.S.C. 154(b) by 205 days.

(21) Appl. No.: 16/012,270

(22) Filed: Jun. 19, 2018

(65) Prior Publication Data

US 2018/0367304 A1    Dec. 20, 2018

(30) Foreign Application Priority Data

Jun. 20, 2017   (EP) .................................. 17176836

(51) Int. Cl.
*H04L 9/30*   (2006.01)
*H04L 9/32*   (2006.01)
(Continued)

(52) U.S. Cl.
CPC .......... *H04L 9/304* (2013.01); *G05B 19/4185* (2013.01); *H04L 9/3247* (2013.01); *H04L 9/3297* (2013.01); *H04L 12/40* (2013.01); *H04L 43/028* (2013.01); *H04L 63/0428* (2013.01); *H04L 63/126* (2013.01); *H04L 65/1059* (2013.01); *H04L 65/40* (2013.01); *H04L 65/607* (2013.01); *G05B 2219/23113* (2013.01); *G05B 2219/25154* (2013.01); *G05B 2219/25163* (2013.01)

(58) Field of Classification Search
CPC ....................................................... H04L 9/304
USPC ............................................................. 380/28
See application file for complete search history.

(56) References Cited

U.S. PATENT DOCUMENTS

| 2004/0093357 A1* | 5/2004 | Eckardt .................. H04L 41/00 |
| 2005/0213751 A1* | 9/2005 | Apostolopoulos ...... H04L 9/065 380/28 |

(Continued)

FOREIGN PATENT DOCUMENTS

| DE | 102014017671 | 6/2016 |
| EP | 1418706 | 5/2004 |

(Continued)

*Primary Examiner* — Peter C Shaw
(74) *Attorney, Agent, or Firm* — Cozen O'Connor

(57) ABSTRACT

A method for real-time-based transfer of data telegrams from a verified transmitter to a verified receiver without delays, wherein (a) each data telegram to be transferred from the transmitter to the receiver is provided with an additional data index, (b) each received data is stored in a memory, along with the associated additional data index, (c) after elapse of a predetermined time interval, or after transference of a defined number of data telegrams, the transmitter transfers a second time data telegram already transferred to the receiver which has an additional signature, and where the data telegram transferred the second time is additionally encrypted by the transmitter, and (d) after receiving the signed data telegram transferred the second time, the signed data telegram transferred the second time is compared with the corresponding data telegram stored in the memory to verify the transmitter, and where (e) steps a) to d) are repeated.

17 Claims, 3 Drawing Sheets

(51) Int. Cl.
*H04L 29/06* (2006.01)
*H04L 12/40* (2006.01)
*G05B 19/418* (2006.01)
*H04L 12/26* (2006.01)

(56) References Cited

U.S. PATENT DOCUMENTS

2012/0066503 A1* 3/2012 Koppers ............ G05B 19/4186
713/176
2016/0173513 A1* 6/2016 Rohde ................. H04L 63/1416
726/23

FOREIGN PATENT DOCUMENTS

EP 2407843 1/2012
WO WO/2016/094703 6/2016

* cited by examiner

SECURE, REAL-TIME BASED DATA TRANSFER

BACKGROUND OF THE INVENTION

1. Field of the Invention

The invention relates to a method for real-time-based transfer, from at least one transmitter to at least one receiver, of a plurality of data telegrams by a field bus in an industrial plant, in particular an automation plant or processing plant, associated communication system and to an industrial plant.

2. Description of the Related Art

In the context of industrial processing, manufacturing and plant technology, field buses based on general communication standards are used for the communication of individual components of the industrial plant. To ensure, when these communication standards are utilized, that communication is secure, various security measures should be performed.

On the one hand, the communication partners involved in the communication network that is based on the field bus must be identified as trustworthy. Typically, this is achieved using special signatures.

On the other hand, the data telegrams that are transferred within the communication network should be encrypted. To achieve this, the communication partners each need a special security chip or corresponding logic circuits. Both the transmitter of a data telegram and the receiver must have this security chip so that the encryption and the corresponding decryption of the data telegrams can be performed.

In processing, manufacturing and plant technology, the field bus connects individual field devices, such as sensors, measuring transducers, substations or drives, to controllers (CPUs, PLCs or processors). Because of the short response times that are demanded from detecting a measured value to triggering an actuator, the field bus that is used must be capable of acting (almost) in real-time. The above-mentioned, previously known methods for securing communication may, because of the complex encryption and decryption of the data telegrams in the demanded response times, result in signal drop-outs or delays on the field bus. Typically, a delay or signal drop-outs on the field bus results in a stoppage of the industrial plant that is operated with the field bus, and in the production outages associated therewith.

SUMMARY OF THE INVENTION

The object of the invention is to ensure security, in particular an identity of communication partners, when data telegrams are transferred by a field bus, where the data telegrams are transferred in real time (with only negligible delays).

This and other objects and advantages are achieved in accordance with the invention by a method for real-time transfer of a plurality of data telegrams, a communication system and an industrial plant, wherein each data telegram to be transferred from the (verified) transmitter to the (verified) receiver is provided with an additional data index by the transmitter. The receiver stores each data telegram received from the transmitter in a memory, along with the associated additional data index. Once a predetermined time interval has elapsed, or once a defined number of data telegrams has been transferred, the transmitter again transfers a data telegram that has already been transferred to the receiver, where the data telegram transferred a second time has an additional (device) signature. Preferably, the data telegram transferred the second time is additionally encrypted by the transmitter. After receiving the signed data telegram that has been transferred a second time, the receiver additionally performs a comparison of the signed data telegram transferred the second time with the corresponding data telegram stored in the memory, to verify the transmitter. The method in accordance with the invention is then repeated any number of times as desired.

In the context of this application, the term "real time" should be understood to mean correspondingly short response times that are required when field buses are used in the context of industrial plant.

Typically, a transfer of the data telegrams by the field bus is performed in an industrial plant, in particular an automation or processing plant, only within the plant, i.e., in a locally highly restricted area. The transferred data telegrams are, for example, measured values, binary signal or control signals having uniform and in particular standardized data formats. Without a detailed knowledge of the topology of a plant and the communication connections between the individual receivers and transmitters, the content of the transferred data telegrams cannot be revealed to a person. If the person is on site, the content of the data telegrams is directly visible, for example, using local display devices.

The Applicant has realized that, in the context explained above, it is largely possible to dispense with encryption of the transferred data telegrams. All that has to be ensured is that the transmitter of the data telegrams cannot be replaced unnoticed, something which would result in the security of the data transfer no longer being ensured.

The invention is based on the surprising realization that an actual transfer of the data telegrams over field bus systems from the at least one transmitter to the at least one receiver can be performed in real-time, substantially without additional security measures. In order to ensure the security of the data transfer, within the scope of the method in accordance with the invention, each data telegram to be transferred from the transmitter to the receiver is provided with a data index. Here, the data index serves to identify unambiguously the respective transferred data telegram. Here, providing the data telegrams with the data index represents only negligible additional work for the transmitter and the receiver.

The receiver stores each data telegram received from the transmitter, together with the associated data index, in a (data) memory. Here, the memory may be integrated directly into the receiver. However, it is also possible for the receiver to access a separate memory that is arranged outside the receiver.

Once a defined time interval has elapsed, or as an alternative once a defined number of data telegrams has been transferred, the transmitter re-transfers a data telegram that has already been transferred. Here, the data telegram that is re-transferred is in particular encrypted and provided with a digital signature. Using this signature, the receiver can conclude whether the transmitter is trustworthy. For this purpose, the receiver decrypts the data telegram that has been transferred a second time using a key that is known to the receiver, and in this way obtains the unencrypted data telegram that has been transferred a second time. Using the unambiguous data index, the receiver can compare the data telegram that has been transferred a second time with the original data telegram that was transferred previously (unencrypted). If the two data telegrams agree, the transmitter's authenticity is ensured.

As the signature method, it is possible, for example, without being restricted thereto, to use an RSA signature. The public key of the transmitter that is required for this may be stored directly in the receiver. As an alternative, it is also possible for the receiver to access an external signature location at which the transmitter is registered as a trustworthy communication partner.

High-performance security chips that are conventionally used in the transmitter and in the receiver produce a comparatively high power loss in the encryption and decryption of the data telegrams. In automation technology, fanless operation of all components in the harsh industrial environment is a major advantage. This means that almost all components are entirely encapsulated, and the waste heat produced can be removed purely by convection through the housing. The high power loss arising in a specific location when high-performance security chips are used cannot be dissipated by convection, or only to an inadequate extent. Here, a relatively high maximum ambient temperature of typically 60° C. to 85° C. for outdoor components also has to be taken into account.

The method in accordance with the invention minimizes the required encryptions and decryptions by comparison with the conventional methods known and used hitherto. The procedure for the few encryptions and decryptions that are required may, moreover, be performed at a relatively slow rate, in parallel with the actual processing of the data telegrams in the transmitter and the receiver. Thus, the method in accordance with the invention can result in a marked reduction in the processing power and, hence, the power loss occurring in the transmitter and the receiver. In addition, security chips that operate at markedly lower performance can be used.

During the data transfer between the transmitter and the receiver, the method in accordance with the invention may be repeated any number of times as desired.

The data index may be generated by the transmitter using a continuous sequence. In particular, incremental numbering is possible for this. As an alternative, the data index may be generated from a randomly determined code.

In an advantageous embodiment of the method, the defined time interval or the defined number of data telegrams is varied after the above-mentioned method steps in accordance with disclosed embodiments of the invention have been performed one or more times. By varying a moment of transmission of the data telegram that is transferred a second time, in addition it becomes more difficult for someone possibly attacking the communications to identify a structure to the security measures taken. Here, the variation may after each run of the method in accordance with the invention.

Advantageously, the predetermined time interval or the defined number of data telegrams between transmission of the signed data telegrams that are transferred a second time is adapted to a processor processing power of the worst-performing receiver. The greater the processor processing power available to the receiver, the shorter the time interval between the data telegrams that are transferred a second time may be selected by the transmitter. As a result, transmitter/receiver devices that have mutually differing levels of processor processing power can communicate with one another in a simple manner.

In an advantageous embodiment of the invention, on at least one occasion, preferably each occasion, the method steps in accordance with disclosed embodiments of the invention are repeated, a signed data telegram that is transferred from the transmitter to the receiver a second time has a data index that differs from the data index of the signed data telegram that was transferred a second time in the previous run. Put differently, for example, the first time the method in accordance with disclosed embodiments of the invention is performed, a data telegram having the data index 1 may be transferred a second time. The next time it is performed, for example, a data telegram having the data index 2 is then transferred. The subsequent time that it is performed, finally for example a data telegram having the data index 3 is transferred a second time. In this way, security of the method may be increased yet further.

The above-mentioned variation of the data index may also be combined with the likewise above-mentioned variation of the moments of transmission of the data telegrams that are transferred a second time, in order to increase security.

Preferably, the signed data telegram that is transferred the second time during a run of the method in accordance with disclosed embodiments of the invention additionally includes an item of information on the data index of the signed data telegram that is to be transferred a second time during the subsequent run of the method in accordance with disclosed embodiments of the invention. Thus, the transmitter communicates to the receiver an item of information on the data telegram that is to be checked in the next method run. As a result, the check data telegrams that are transferred a second time are concatenated such that it becomes almost impossible for an attacker to tamper with data transfer. In addition, the receiver need not store in the memory every data telegram that is received from the transmitter but only the one to which it has already been alerted previously. This allows the required memory size to be made smaller, the burden of work (load) on the receiver to be reduced, and access time to the data telegram that is stored in the memory and is to be compared to be minimized.

If, as is conventional in the case of an industrial plant operated by a field bus system, the data transfer is performed synchronously or cyclically, the transmitter may advantageously use a data index in the form of a continuous sequence to communicate to the receiver which data telegram is the next to be checked. In the case of asynchronously transferred data telegrams, such as one-off events, the transmitter advantageously uses a data index with a randomly determined code.

In a preferred embodiment of the method, when a connection is initially created between the transmitter and the receiver, a verification of the transmitter with respect to the receiver is additionally performed, by exchanging security keys. Typically, making the connection is not time-critical, and for this reason the verification may in this case be performed using known methods that are not capable of acting in real time (such as the exchange of security keys). For this, the transmitter can advantageously communicate to the receiver the data index of the first data telegram that is to be transferred a second time, in order to initiate the above-mentioned security concatenation between the data telegrams that are transferred a second time.

Preferably, the receiver communicates to the transmitter, or the transmitter communicates to the receiver, a respective release signal that signals to the respectively other communication partner when it may transfer a succeeding data telegram, preferably the next data telegram that is transferred a second time. As a result, free capacity of the transmitter and/or the receiver may be utilized efficiently, and response times of the communication partners may be made shorter, which improves their capacity for acting in real-time.

The method for real-time-based transfer of a plurality of data telegrams is preferably used in a communication system having at least one receiver and at least one transmitter that are connected to one another by a field bus, where the transmitter and receiver each use a security chip for encrypting and/or decrypting data telegrams or a corresponding logic circuit. Here, the security chips or corresponding logic circuit serve to encrypt/sign the data telegram that is to be transferred a second time, on the part of the transmitter, and to decrypt the data telegram that has been transferred a second time, on the part of the receiver.

A communication system of this kind is advantageously used in an industrial plant, in particular an automation plant or processing plant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above, and the manner in which these are achieved, will become clearer and more readily understandable in conjunction with the description below of the exemplary embodiments, which are explained in more detail in conjunction with the drawings, and in which.

DETAILED DESCRIPTION OF THE EXEMPLARY EMBODIMENTS

Figure 1:
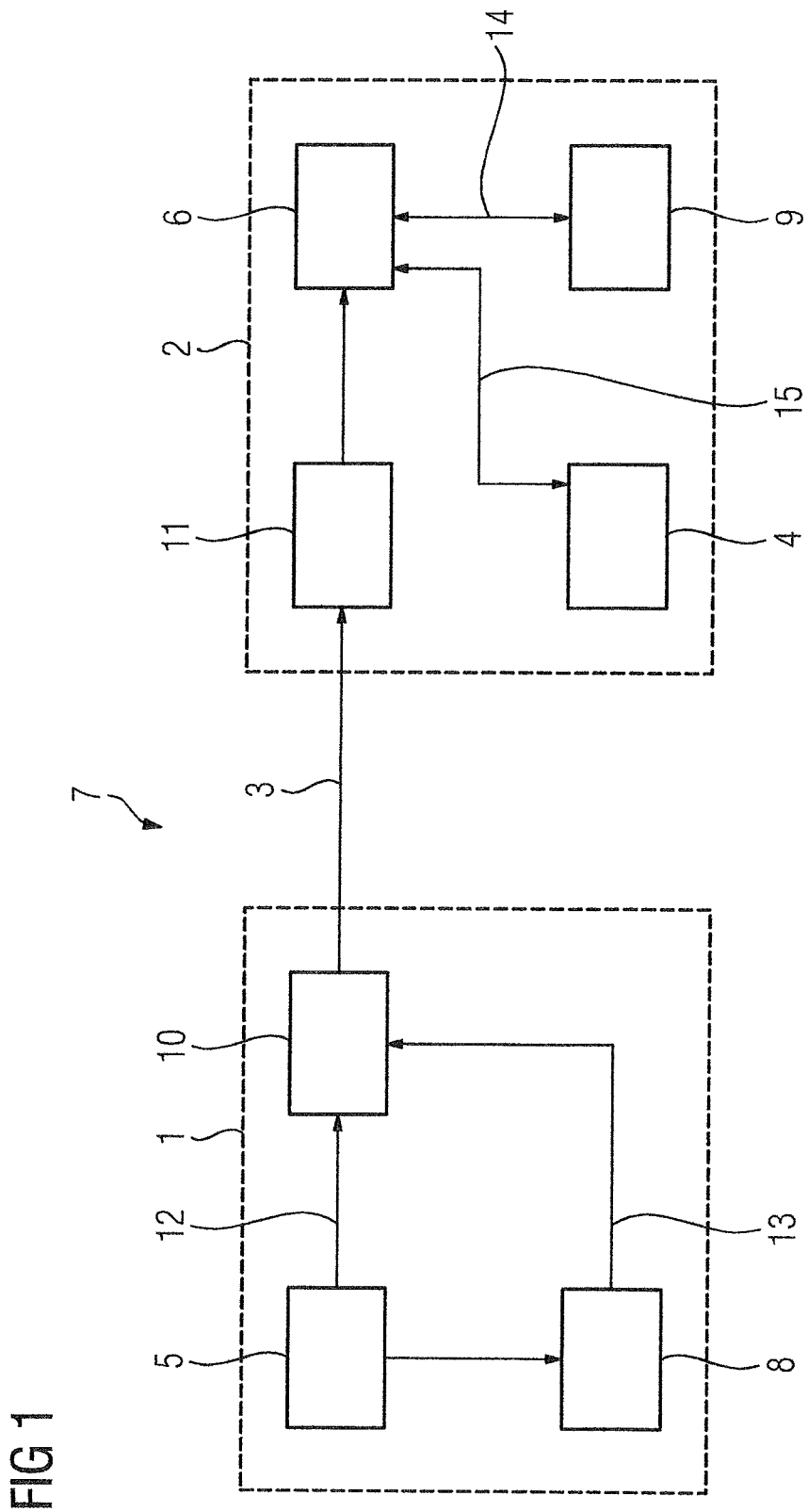
FIG. 1 shows a communication system in accordance with the invention, in a sketch illustrating the principle.

FIG. 1 illustrates a schematic time sequence of an inventive transfer of data telegrams. FIG. 1 illustrates a communication system 7 that is intended and provided for the purpose of performing the method in accordance with the invention and includes a transmitter 1 and a receiver 2. Both the transmitter 1 and the receiver 2 are characterized by an interrupted (dashed) rectangle and have a form that is conventional in this context and is not explained in more detail in the present document.

The transmitter 1 includes a processor or a microcontroller 5, a security chip or corresponding logic circuit 8, and a field bus interface 10. The receiver 2 includes a processor or microcontroller 6, a security chip or corresponding logic circuit 9, and a field bus interface 11 and a memory 4. The two field bus interfaces 10, 11 are connected to one another by a field bus 3. The field bus 3 may be, for example, a PROFIBUS, without however being restricted to this.

The transmitter 1 transfers data telegrams to the receiver 2 via the field bus 3. For this purpose, the processor 5 forwards data telegrams directly to the field bus interface 10 over a first data line 12 unencrypted, and the field bus interface 10 in turn transfers the data telegrams to the field bus interface 11 of the receiver 2 via the field bus 3. The processor 6 of the receiver 2 receives the transferred data telegrams from the field bus interface 11 and stores them in the memory 4 via a memory access 15. In the present exemplary embodiment, the memory 4 is integrated into the receiver 2. However, the memory 4 need not necessarily be integrated into the receiver 2 but may also be arranged externally.

Each data telegram that is forwarded by the processor 5 is provided with a data index thereby. The data index may be generated by the processor 5 of the transmitter 1, using a continuous sequence. In particular, incremental numbering is possible for this. As an alternative, the data index may be generated from a randomly determined code.

Figure 2:
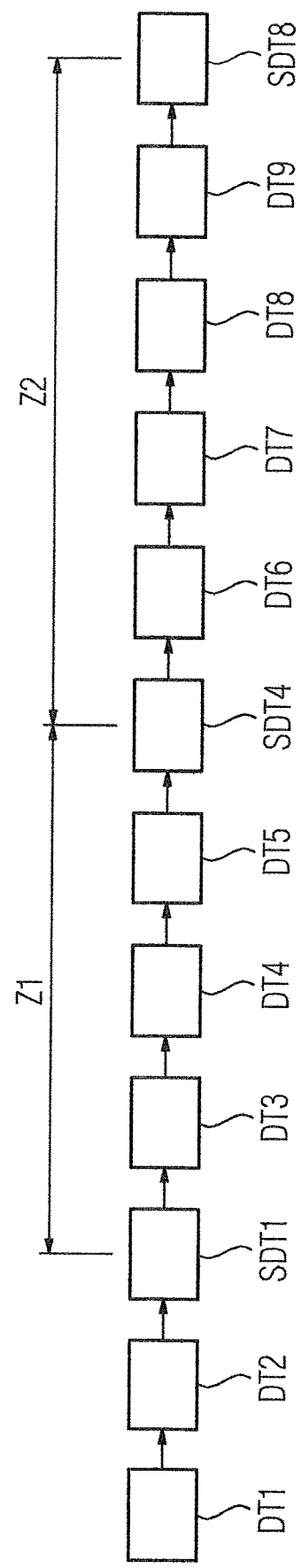
FIG. 2 shows an inventive transfer of data telegrams, in a flow diagram.

FIG. 2 illustrates a sequence of data telegrams that are transferred successively from the transmitter 1 to the receiver 2 in this way. Each data telegram, which is characterized by "DT", is characterized by a data index using incremental numbering ("1", "2", etc.).

After a defined number of transferred data telegrams, or once a particular time interval has elapsed, a data telegram is transferred from the transmitter 1 to the receiver 2 a second time. The processor 5 of the transmitter 1 forwards this data telegram to the security chip 8 of the transmitter 1. There, the data telegram is provided with an unambiguous signature, or encrypted. The signed data telegram that is to be transferred a second time is forwarded over a second data line 13 of the transmitter 1 to the field bus interface 10 of the transmitter 1. From there, it is transferred via the field bus 3 to the field bus interface 11 of the receiver 2. The processor 6 of the receiver 2 identifies that this is a signed data telegram. A decryption procedure 14 performed by the security chip 9 of the receiver 9 decrypts the signed data telegram that has been transferred a second time. A subsequent comparison of the decrypted data telegram with the data telegrams that are stored in the memory 4 and have already been received from the transmitter 1 allows the receiver 2 to establish unambiguously that the transmitter 1 is authentic. Put differently, the receiver 2 can identify the transmitter 1 as trustworthy.

Because of the small number of encryption and decryption procedures and the low priority with respect to time of these procedures, the security chips 8, 9 of the transmitter 1 and the receiver 2 are operated by a comparatively small amount of (electrical) power, which has advantages for energy efficiency of the communication system 7 and facilitates heat management thereof.

In FIG. 2, the signed data telegrams that are transferred a second time are characterized by "SDT". In addition, they have the data index ("1", "2", etc.) of the original data telegram of which they are a repetition. A time interval Z1 between the first data telegram illustrated in FIG. 2 that is sent a second time ("SDT1") and the second data telegram that is sent a second time ("SDT4") is shorter than a time interval Z2 between the second data telegram that is sent a second time ("SDT4") and the third data telegram that is sent a second time ("SDT8"). The time intervals may be varied as desired within the scope of the method in accordance with the invention to increase security against possible attackers.

The signed data telegrams that are transferred a second time may additionally have an item of information on the data index of the signed data telegram that is to be transferred a second time on the succeeding run of the method in accordance with the invention. In this way, an item of information on the data telegram to be checked on the next method run is communicated to the receiver 2 by the transmitter 1. As a result, the check data telegrams that are transferred a second time are concatenated such that it becomes almost impossible for an attacker to tamper with data transfer.

In addition, the receiver 2 need not store every data telegram that is received from the transmitter 1 in the memory 4 but only the one to which it has already been alerted previously. This allows the required memory size to be made smaller, the burden of work on the receiver 2 to be reduced, and access time to the data telegram that is stored in the memory 4 and is to be compared to be minimized.

The communication system 7 may advantageously be used in an industrial plant, preferably an automation plant or processing plant.

Figure 3:
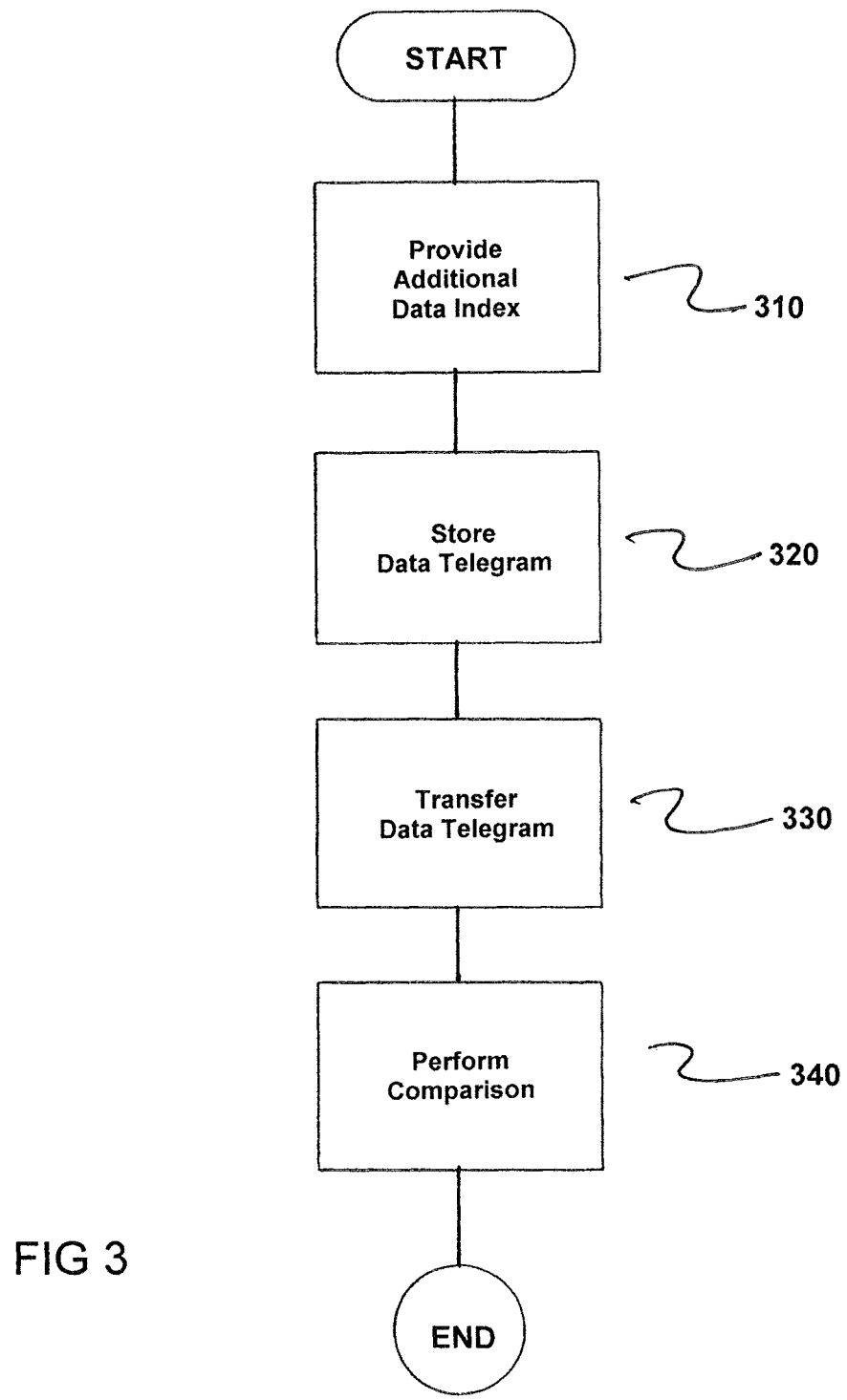
FIG. 3 is a flowchart of the method in accordance with the invention.

FIG. 3 is a flowchart of a method for real-time-based transfer of a plurality of data telegrams by a field bus 3 in an industrial plant from at least one verified transmitter 1 to at least one verified receiver 2 without delays. The method steps comprises providing, by the transmitter 1, each data telegram to be transferred from the transmitter 1 to the receiver 2 with an additional data index, as indicated in step (a).

Next, each data telegram received from the transmitter 1 in a memory 4, along with an associated additional data index is stored by the receiver 2, as indicated in step (b).

Next, a data telegram that has already been transferred is transferred by the transmitter 1 to the receiver 2 a second time after either (i) a defined time interval Z1, Z2 has elapsed or (ii) a defined number of data telegrams is transferred, as indicated in step (c). Here, the data telegram that is transferred the second time has an additional signature, and the data telegram that is transferred the second time is additionally encrypted by the transmitter 1.

Next, a comparison of the signed data telegram transferred a second time with a corresponding data telegram stored in the memory 4 is performed by the receiver 1 after receiving the signed data telegram transferred the second time to verify the transmitter 1, as indicated in step (d).

Although the invention has been illustrated and described in detail by means of the preferred exemplary embodiment, the invention is not restricted by the disclosed examples, and other variations may be derived herefrom by those skilled in the art without departing from the scope of protection of the invention. Thus, the invention may for example be used in industrial plant of any kind, in the sector of production plant and processing plant and likewise in the sector of energy generation or logistics.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for real-time-based transfer of a plurality of data telegrams by a field bus in an industrial plant, without delays, from at least one verified transmitter to at least one verified receiver, the method steps comprising:
   (a) providing, by the transmitter, each data telegram to be transferred from the transmitter to the receiver with an additional data index;
   (b) storing, by the receiver, each data telegram received from the transmitter in a memory, along with an associated additional data index;
   (c) transferring, by transmitter, a data telegram that has already been transferred to the receiver a second time after one of (i) a defined time interval has elapsed and (ii) a defined number of data telegrams is transferred, the data telegram that is transferred the second time having an additional signature, and the data telegram that is transferred the second time being additionally encrypted by the transmitter;
   (d) performing, by the receiver, a comparison of the signed data telegram transferred a second time with a corresponding data telegram stored in the memory after receiving the signed data telegram transferred the second time to verify the transmitter;
   wherein, on each occasion during which steps a) to d) are repeated, a signed data telegram transferred from the transmitter to the receiver the second time has a data index that differs from the data index of the signed data telegram that was transferred the second time in a previous run.

2. The method as claimed in claim 1, wherein one of (i) the defined time interval and (ii) the defined number of data telegrams is varied after steps a) to d) are performed at least one time.

3. The method as claimed in claim 1, wherein one of (i) the defined time interval and (ii) the defined number of data telegrams between transmission of the signed data telegrams transferred the second time is adapted to a processing power of a processor of the at least one receiver.

4. The method as claimed in claim 2, wherein one of (i) the defined time interval and (ii) the defined number of data telegrams between transmission of the signed data telegrams transferred the second time is adapted to a processing power of a processor of the at least one receiver.

5. The method as claimed in claim 2, wherein, on at least one occasion, preferably each occasion, during which steps a) to d) are repeated, a signed data telegram transferred from the transmitter to the receiver the second time has a data index that differs from the data index of the signed data telegram that was transferred the second time in a previous run.

6. The method as claimed in claim 3, wherein, on at least one occasion, preferably each occasion, during which steps a) to d) are repeated, a signed data telegram transferred from the transmitter to the receiver the second time has a data index that differs from the data index of the signed data telegram that was transferred the second time in a previous run.

7. The method as claimed in claim 4, wherein occasion during which steps a) to d) are repeated is each occasion.

8. The method as claimed in claim 1, wherein each signed data telegram transferred the second time additionally includes an item of information on a data index of the signed data telegram to be transferred the second time during a subsequent performance of method steps a) to d).

9. The method as claimed in claim 1, wherein the data index is generated by the transmitter utilizing a continuous sequence, in particular by incremental numbering.

10. The method as claimed in claim 5, wherein the continuous sequence comprises incremental numbering.

11. The method as claimed claim 1, wherein the data index is generated by a randomly determined code.

12. The method as claimed in claim 1, further comprising:
exchanging security keys to perform a verification of the transmitter with respect to the receiver when a connection is initially created between the transmitter and the receiver.

13. The method as claimed in claim 1, wherein the receiver communicates to the transmitter, or conversely the transmitter communicates to the receiver, a release signal that signals to the respectively other communication partner when it may transfer a succeeding data telegram comprising a next data telegram that is transferred the second time.

14. The method as claimed in claim 1, wherein the industrial plant comprises one of (i) an automation plant and processing plant.

15. A communication system comprising:
at least one receiver and at least one transmitter interconnected via a field bus, the transmitter and receiver each including one of (i) a security chip and (ii) a comparable logic circuit for at least one of (i) encrypting and (ii) decrypting data telegrams, and
a processor;
wherein the communication system is configured to perform the real-time-based transfer of data telegrams between the transmitter and the receiver by:
(a) providing, by the transmitter, each data telegram to be transferred from the transmitter to the receiver with an additional data index;
(b) storing, by the receiver, each data telegram received from the transmitter in a memory, along with an associated additional data index;
(c) transferring, by transmitter, a data telegram that has already been transferred to the receiver a second time after one of (i) a defined time interval has elapsed and (ii) a defined number of data telegrams is transferred, the data telegram that is transferred the second time having an additional signature, and the data telegram that is transferred the second time being additionally encrypted by the transmitter; and
(d) performing, by the receiver, a comparison of the signed data telegram transferred a second time with a corresponding data telegram stored in the memory after receiving the signed data telegram transferred the second time to verify the transmitter;
wherein on each occasion during which steps a) to d) are repeated, a signed data telegram transferred from the transmitter to the receiver the second time has a data index that differs from the data index of the signed data telegram that was transferred the second time in a previous run.

16. An industrial plant including the communication system as claimed in claim 9.

17. The industrial plant of claim 10, wherein the industrial plant comprises one of (i) an automation plant and (ii) processing plant.

* * * * *